US012261943B2

United States Patent
Shiotani

(10) Patent No.: US 12,261,943 B2
(45) Date of Patent: Mar. 25, 2025

(54) COMMUNICATION SYSTEM, NON-TRANSITORY COMPUTER-READABLE MEDIUM STORING COMPUTER-READABLE INSTRUCTIONS FOR TERMINAL DEVICE, FIRST COMMUNICATION DEVICE AND SECOND COMMUNICATION DEVICE

(71) Applicant: BROTHER KOGYO KABUSHIKI KAISHA, Nagoya (JP)

(72) Inventor: Takeshi Shiotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 469 days.

(21) Appl. No.: 17/533,515

(22) Filed: Nov. 23, 2021

(65) Prior Publication Data

US 2022/0173892 A1 Jun. 2, 2022

(30) Foreign Application Priority Data

Nov. 27, 2020 (JP) ................. 2020-196940

(51) Int. Cl.
*H04L 9/08* (2006.01)
*H04L 9/14* (2006.01)

(52) U.S. Cl.
CPC ............ *H04L 9/0825* (2013.01); *H04L 9/085* (2013.01); *H04L 9/14* (2013.01)

(58) Field of Classification Search
None
See application file for complete search history.

(56) References Cited

U.S. PATENT DOCUMENTS 6,084,969 A * 7/2000 Wright ................ H04W 88/185
713/153
8,233,934 B2 * 7/2012 Ahmavaara ............. H04L 67/51
455/435.2

(Continued)

FOREIGN PATENT DOCUMENTS

CN 108510405 A 9/2018
JP 2010050905 A 3/2010

(Continued)

OTHER PUBLICATIONS

Wi-Fi Alliance, Wi-Fi Peer-to-Peer (P2P) Technical Specification Version1.1.

(Continued)

*Primary Examiner* — Bassam A Noaman
(74) *Attorney, Agent, or Firm* — Scully, Scott, Murphy & Presser, P.C.

(57) ABSTRACT

A terminal device may receive information indicating a first key from a first communication device, receive information indicating a second key from a second communication device. receive first encrypted connection information from a first communication device as a response to a request, decrypt the first encrypted connection information by using the first key indicated by the information received from the first communication device so as to obtain connection information, generate second encrypted connection information by encrypting the obtained connection information by using the second key indicated by the information received from the second communication device; and send the second encrypted connection information to the second communication device, wherein the second communication device decrypts the second encrypted connection information received from the terminal device and establishes a wireless (Continued)

connection with a specific device by using the connection information.

12 Claims, 5 Drawing Sheets

(56) References Cited

U.S. PATENT DOCUMENTS

| | | | |
|---|---|---|---|
| 9,351,154 B1* | 5/2016 | Steve | H04W 4/80 |
| 2006/0229978 A1* | 10/2006 | Popovic | G06Q 40/03 |
| | | | 705/35 |
| 2008/0060055 A1* | 3/2008 | Lau | H04L 63/0823 |
| | | | 726/3 |
| 2011/0153635 A1* | 6/2011 | Figueroa | G06F 16/2425 |
| | | | 707/769 |
| 2014/0148098 A1 | 5/2014 | Song | |
| 2017/0289393 A1 | 10/2017 | Yokoyama et al. | |
| 2019/0020783 A1 | 1/2019 | Yokoyama et al. | |
| 2019/0215878 A1 | 7/2019 | Goto | |
| 2020/0186669 A1 | 6/2020 | Yokoyama et al. | |
| 2021/0037026 A1* | 2/2021 | Saarinen | H04L 63/18 |
| 2021/0112177 A1 | 4/2021 | Yokoyama et al. | |
| 2022/0015161 A1 | 1/2022 | Goto | |
| 2022/0103535 A1* | 3/2022 | Chifor | H04L 63/061 |
| 2022/0329414 A1* | 10/2022 | Gaddam | H04L 63/0464 |

FOREIGN PATENT DOCUMENTS

| | | | |
|---|---|---|---|
| JP | 2014529210 A | | 10/2014 |
| JP | 2015179919 A | * | 10/2015 |
| JP | 2016-178412 A | | 10/2016 |
| JP | 2017034692 A | | 2/2017 |
| JP | 2017-112432 A | | 6/2017 |
| JP | 2017-184169 A | | 10/2017 |
| JP | 2018042058 A | | 3/2018 |

OTHER PUBLICATIONS

English-language translation of Japanese Office Action dated Jul. 23, 2024, received in a corresponding foreign application, namely Japanese Patent Application No. 2020-196940, 8 pages.

* cited by examiner (First Embodiment: Continuation from FIG.2)

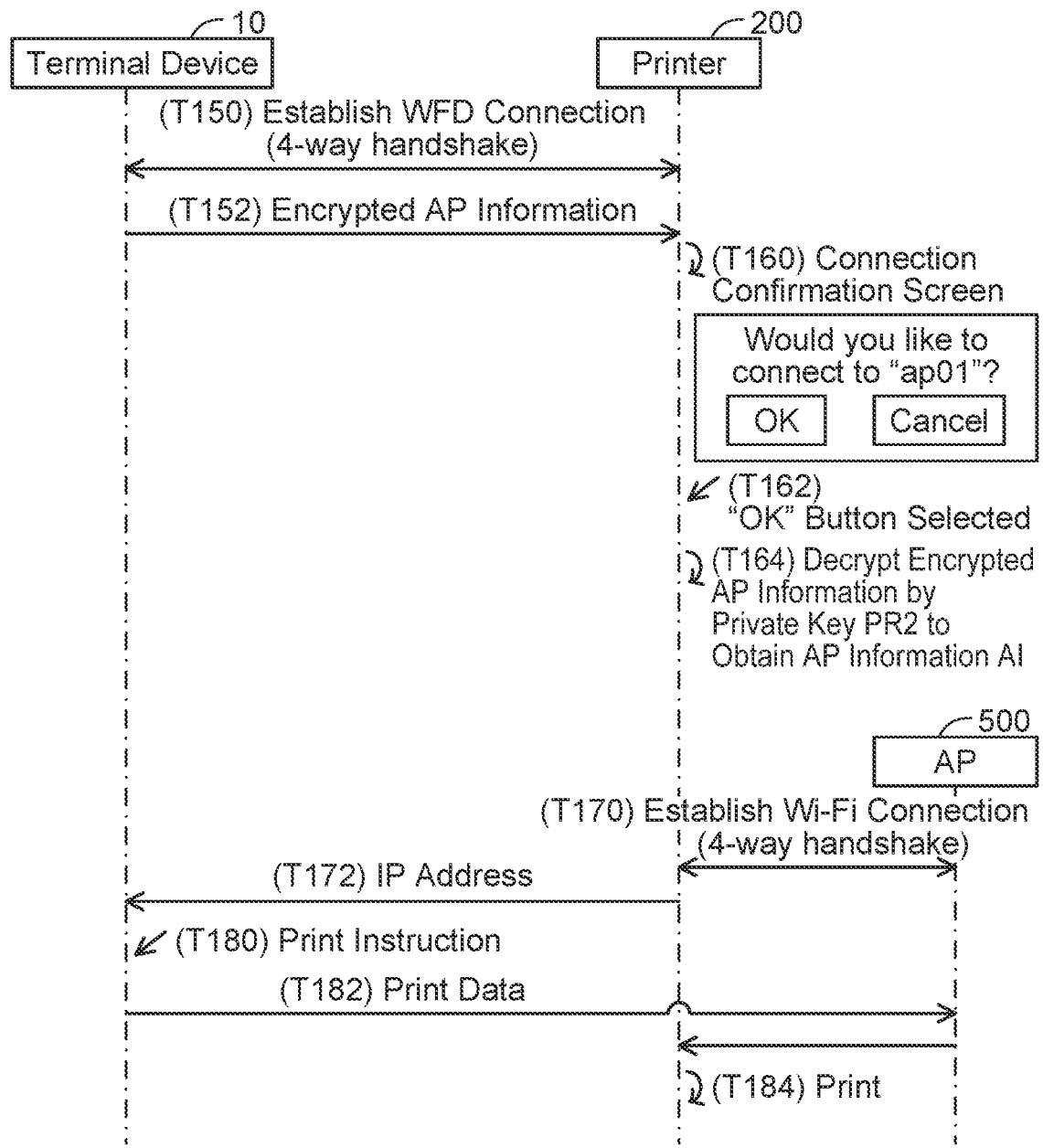

COMMUNICATION SYSTEM, NON-TRANSITORY COMPUTER-READABLE MEDIUM STORING COMPUTER-READABLE INSTRUCTIONS FOR TERMINAL DEVICE, FIRST COMMUNICATION DEVICE AND SECOND COMMUNICATION DEVICE

CROSS-REFERENCE TO RELATED APPLICATION

This application claims priority to Japanese Patent Application No. 2020-196940 filed on Nov. 27, 2020, the contents of which are hereby incorporated by reference into the present application.

TECHNICAL FIELD

The disclosure herein discloses teachings for communicating connection information.

BACKGROUND

Smart devices that mediate settings for wireless communication between a first device and a second device are known. Such a smart device executes NFC (near field communication) communication with the first device to receive network information from the first device. The smart device executes NFC communication with the second device to send the network information to the second device. The second device connects to a wireless LAN (local area network).

SUMMARY

The disclosure herein provides techniques for facilitating encryption of connection information for intermediation of the connection information.

A communication system disclosed herein may comprise: a terminal device; a first communication device configured to store first key information for encrypting and decrypting information; and a second communication device configured to store second key information for encrypting and decrypting information. The first communication device may be configured to externally send information indicating a first key included in the first key information, and the second communication device may be configured to externally send information indicating a second key included in the second key information. The terminal device may be configured to: receive the information indicating the first key from the first communication device; receive the information indicating the second key from the second communication device; in response to sending a request to the first communication device, receive first encrypted connection information from the first communication device as a response to the request, the first encrypted connection information being information that is obtained by the first communication device encrypting connection information by using the first key information, and the connection information being for establishing a wireless connection with a specific device; in a case where the first encrypted connection information is received from the first communication device, decrypt the first encrypted connection information by using the first key indicated by the information received from the first communication device so as to obtain the connection information; generate second encrypted connection information by encrypting the obtained connection information by using the second key indicated by the information received from the second communication device; and send the second encrypted connection information to the second communication device. The second communication device may be further configured to: receive the second encrypted connection information from the terminal device; in a case where the second encrypted connection information is received form the terminal device, decrypt the second encrypted connection information by using the second key information so as to obtain the connection information; and establish the wireless connection with the specific device by using the obtained connection information.

Moreover, a non-transitory computer-readable medium storing computer-readable instructions for a terminal device is disclosed herein. The computer-readable instructions, when executed by a processor of the terminal device, may cause the terminal device to: in a case where a first communication device storing first key information for encrypting and decrypting information externally sends information indicating a first key included in the first key information, receive the information indicating the first key from the first communication device; in a case where a second communication device storing second key information for encrypting and decrypting information externally sends information indicating a second key included in the second key information, receive the information indicating the second key from the second communication device; in response to sending a request to the first communication device, receive first encrypted connection information from the first communication device as a response to the request, the first encrypted connection information being information that is obtained by the first communication device encrypting connection information by using the first key information, and the connection information being for establishing a wireless connection with a specific device; in a case where the first encrypted connection information is received from the first communication device, decrypt the first encrypted connection information by using the first key indicated by the information received from the first communication device so as to obtain the connection information; generate second encrypted connection information by encrypting the obtained connection information by using the second key indicated by the information received from the second communication device; and send the second encrypted connection information to the second communication device, wherein the second communication device decrypts the second encrypted connection information received from the terminal device by using the second key information so as to obtain the connection information and establishes the wireless connection with the specific device by using the obtained connection information.

Further, a second communication device is disclosed herein. The second communication device may comprise a processor; and a memory storing computer-readable instructions and second key information for encrypting and decrypting information, wherein the second key information is different from first key information stored in a first communication device different from the second communication device. The computer-readable instructions, when executed by the processor, may cause the second communication device to: externally send information indicating a second key included in the second key information, wherein the information indicating the second key is received by a terminal device, and wherein the terminal device receives information indicating a first key from the first communication device; in response to sending a request to the first communication device, the terminal device receives first encrypted connection information from the first communication device as a response to the request; the terminal device decrypts the first encrypted connection information by using the first key indicated by the information received from the first communication device so as to obtain connection information for establishing a wireless connection with a specific device; the terminal device generates second encrypted connection information by encrypting the obtained connection information by using the second key indicated by the information received from the second communication device; and the terminal device sends the second encrypted connection information to the second communication device; receive the second encrypted connection information from the terminal device; in a case where the second encrypted connection information is received from the terminal device, decrypt the second encrypted connection information by using the second key information so as to obtain the connection information; and establish the wireless connection with the specific device by using the obtained connection information.

In addition, a first communication device is disclosed herein. The first communication device may comprise: a processor; and a memory storing computer-readable instructions and first key information for encrypting and decrypting information, wherein the first key information is different from second key information stored in a second communication device different from the first communication device. The computer-readable instructions, when executed by the processor, may cause the first communication device to: externally send information indicating a first key included in the first key information, wherein the information indicating the first key is received by a terminal device; in response to receiving a request from the terminal device, send first encrypted connection information to the terminal device as a response to the request, wherein the first encrypted connection information is information that is obtained by the first communication device encrypting connection information by using the first key information, and the connection information is for establishing a wireless connection with a specific device, and wherein the terminal device receives information indicating a second key included in the second key information from the second communication device; the terminal device decrypts the first encrypted connection information received from the first communication device by using the first key indicated by the information received from the first communication device so as to obtain the connection information; the terminal device generates second encrypted connection information by encrypting the obtained connection information by using the second key indicated by the information received from the second communication device; the terminal device sends the second encrypted connection information to the second communication device; the second communication device decrypts the second encrypted connection information by using the second key information so as to obtain the connection information and establishes the wireless connection with the specific device by using the obtained connection information.

The terminal device above and a control method and a non-transitory computer-readable medium storing computer-readable instructions for implementing the terminal device above are also novel and useful. A control method and a non-transitory computer-readable medium storing computer-readable instructions for implementing the first communication device above are also novel and useful. A control method and a non-transitory computer-readable medium storing computer-readable instructions for implementing the second communication device above are also novel and useful.

BRIEF DESCRIPTION OF DRAWINGS

FIG. 5 illustrates the continuation of FIG. 4.

DETAILED DESCRIPTION

Figure 1:
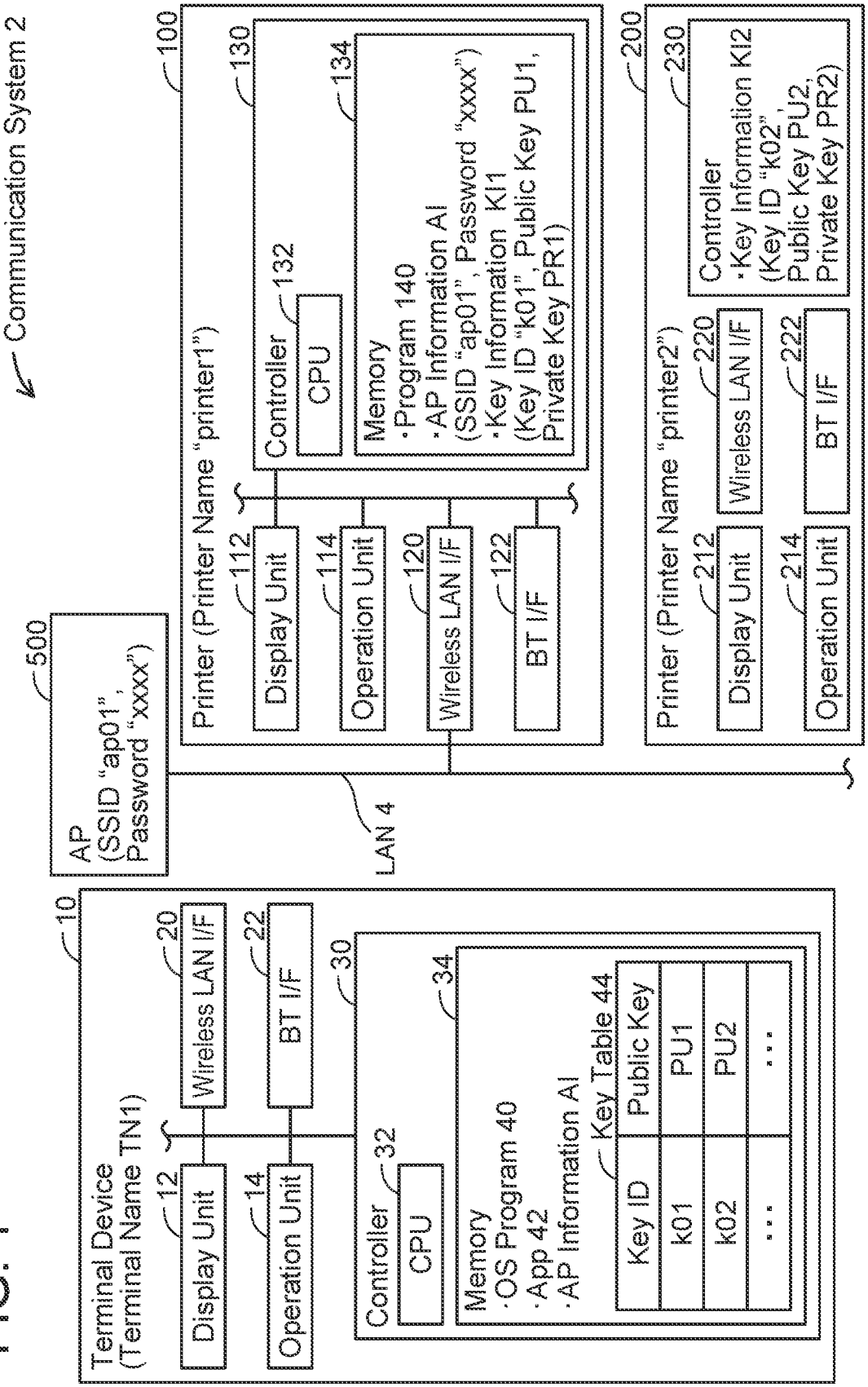
FIG. 1 illustrates a configuration of a communication system.

First Embodiment (Configuration of Communication System 2; FIG. 1)

As illustrated in FIG. 1, a communication system 2 comprises a terminal device 10, two printers 100, 200, and an access point 500 (an access point will be abbreviated as "AP" hereinafter). The terminal 10 is a portable terminal such as a tablet PC, smartphone, or the like. In a variant, the terminal device 10 may be a terminal device such as a desktop PC, a laptop PC, or the like. The printer 100 is connected to a LAN (local area network) 4. In a variant, the printer 100 may not be connected to the LAN 4.

The LAN 4 is a wireless LAN formed by the AP 500. The AP 500 stores an SSID (service set identifier) "ap01" for identifying the LAN 4 and a password "xxxx" used in the LAN 4.

For example, a user newly purchases the printer 200. The present embodiment assumes that the printer 200 is to be newly connected to the LAN 4.

(Configuration of Printer 100)

The printer 100 comprises a display unit 112, an operation unit 114, a wireless LAN interface 120, a Bluetooth (registered trademark) interface 122, and a controller 130. The units 112 to 130 are connected to a bus line (reference sign omitted). Hereinafter, an interface will be abbreviated as "I/F" and Bluetooth will be abbreviated as "BT".

The display unit 112 is a display for displaying various types of information. The operation unit 114 includes a plurality of keys. The user can input various instructions to the printer 100 by operating the operation unit 114. The display unit 112 may function as a touch screen that receives instructions from the user (i.e., as an operation unit).

The wireless LAN I/F 120 is an I/F for wireless communication via the LAN 4. The wireless communication via the LAN 4 is, for example, communication according to a Wi-Fi scheme (which will be termed "Wi-Fi communication" hereinafter). The Wi-Fi scheme is a wireless communication scheme for executing wireless communication according to, for example, the 802.11 standard of IEEE (The Institute of Electrical and Electronics Engineers, Inc.) and a standard complying therewith (e.g., 802.11a, 11b, 11g, 11n, 11ac, etc.).

The BT I/F 122 is an I/F for wireless communication according to a BT scheme (which will be termed "BT communication" hereinafter). The BT scheme is a wireless communication scheme based on, for example, the 802.15.1 standard of IEEE and standards complying therewith. More specifically, the BT I/F 122 supports BLE (Bluetooth Low Energy). BLE is a standard implemented by version 4.0 or later of the BT scheme. The BT I/F 122 is configured to execute wireless communication according to BLE (which will be termed "BLE communication").

Differences between the Wi-Fi scheme and the BT scheme are as below. The communication speed of the Wi-Fi communication (e.g., the maximum communication speed 600 Mbps) is faster than the communication speed of the BT communication (e.g., the maximum communication speed 24 Mbps). The carrier frequency of the Wi-Fi communication is in a 2.4 GHz band or in a 5.0 GHz band. The carrier frequency of the BT communication is in the 2.4 GHz band. That is, when the 5.0 GHz band is used as the carrier frequency of the Wi-Fi communication, the carrier frequency of the Wi-Fi communication is different from the carrier frequency of the BT communication. Further, the maximum distance with which the Wi-Fi communication can be executed (e.g., approximately 100 m) is larger than the maximum distance with which the BT communication can be executed (e.g., approximately a few tens of meters).

The controller 130 includes a CPU 132 and a memory 134. The CPU 132 is configured to execute various processes according to a program 140 stored in the memory 134. The memory 134 is configured of a volatile memory, a non-volatile memory, etc.

The memory 134 further stores AP information AI for connection to the LAN 4. The AP information AI is information related to the AP 500 and includes the SSID "ap01" and the password "xxxx".

The memory 134 further stores key information KI1. The key information KI1 includes a pair of keys according to a public key encryption scheme, namely, a public key PU1 and a private key PRE The key information KI1 further includes a key ID "k01" for identifying the public key PU1.

The printer 100 is assigned with a printer name "printer1" for identifying the printer 100. The printer 200 is assigned with a printer name "printer2" for identifying the printer 200. The printer 200 has a similar configuration to that of the printer 100. That is, the printer 200 comprises a display unit 212, an operation unit 214, a wireless LAN I/F 220, a BT I/F 222, and a controller 230. A memory (not illustrated) of the controller 230 stores key information KI2. The key information KI2 includes a public key PU2, a private key PR2, and a key ID "k02" for identifying the public key PU2.

(Configuration of Terminal Device 10)

The terminal device 10 comprises a display unit12, an operation unit 14, a wireless LAN I/F 20, a BT I/F 22, and a controller 30. The units 12 to 30 are connected to a bus line (reference sign omitted).

The display unit 12 is a display for displaying various types of information, and the operation unit 14 is, for example, a touch screen. The operation unit 14 is configured to receive various instructions.

The controller 30 includes a CPU 32 and a memory 34. The CPU 32 is configured to execute various processes according to programs 40, 42 stored in the memory 34. The memory 34 is configured of a volatile memory, a non-volatile memory, etc. The OS (Operating System) program 40 is a program for basic processes of the terminal device 10. The application program 42 (hereinafter "app 42") is a program for connecting a printer to the LAN 4.

The memory 34 further stores the AP information AI. The terminal 10 can connect to the LAN 4 by using the AP information AI.

The memory 34 further stores a key table 44 that stores a plurality of public keys. For each of the plurality of public keys, the key table 44 stores the public key (e.g., PU1) and the key ID (e.g., "k01") for identifying the public key in association with each other. The app 42 and the key table 44 are downloaded to the terminal device 10 from, for example, a server on the Internet (not illustrated). The app 42 and the key table 44 are uploaded to the server by, for example, a vendor of the printer (e.g., 100).

Figure 2:
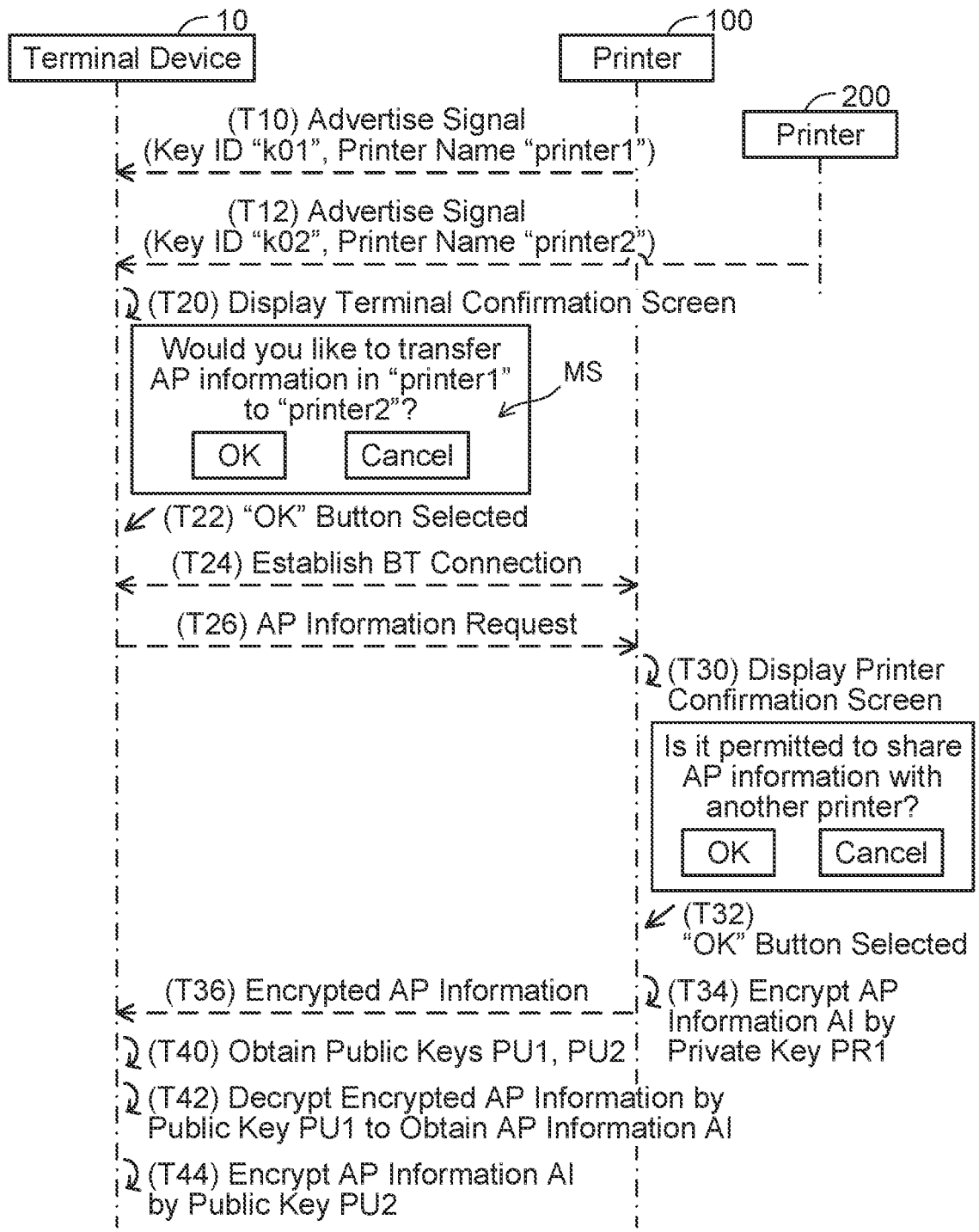
FIG. 2 illustrates a sequence diagram of a process executed by a communication system according to a first embodiment.
Figure 3:
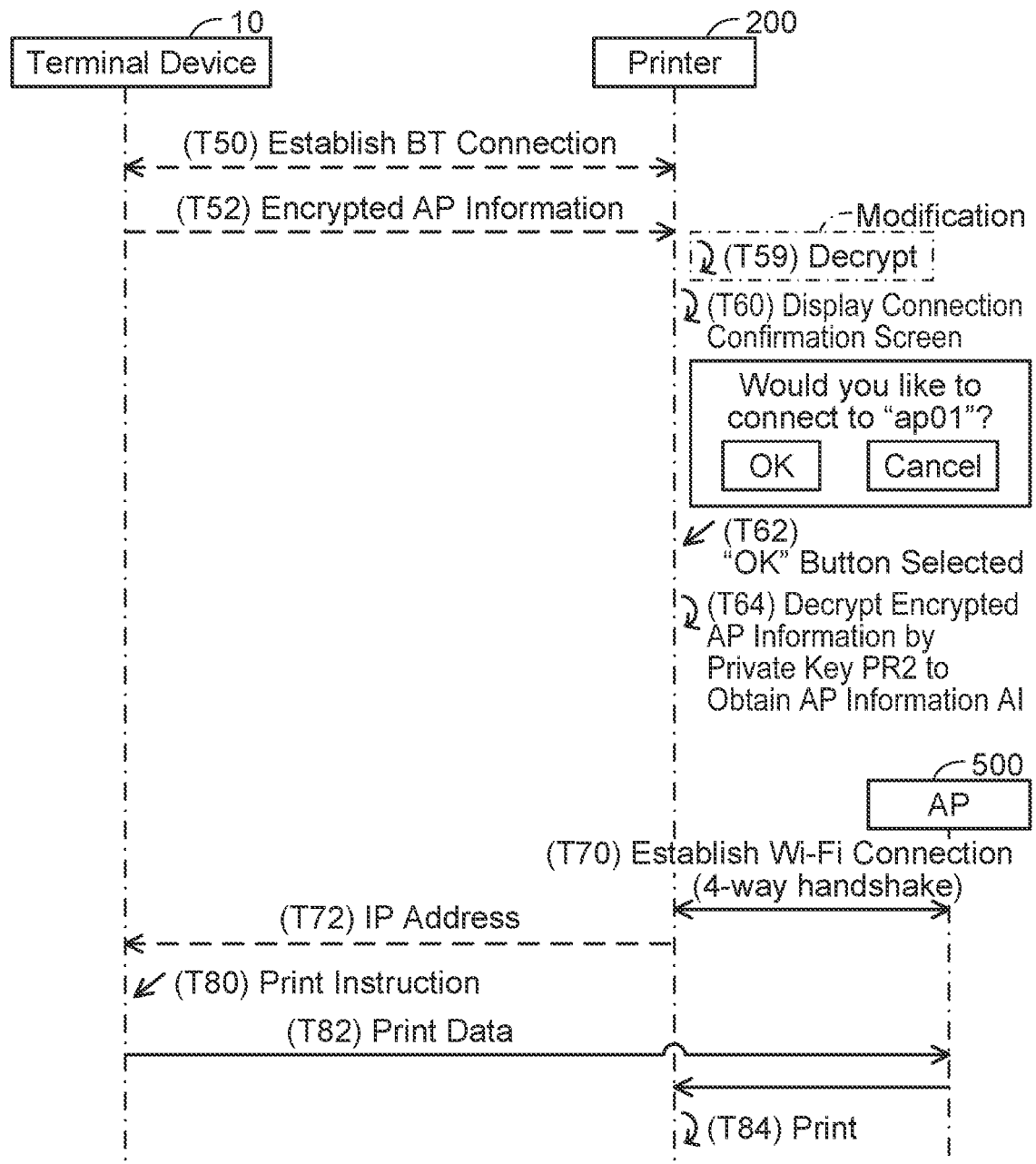
FIG. 3 illustrates the continuation of FIG. 2.

(Process Implemented by Communication System 2; FIGS. 2 and 3)

Referring to FIGS. 2 and 3, a process implemented by the communication system 2 will be described. In an initial stage of the present case, the terminal device 10 is already connected to the LAN 4. In a variant, the terminal device 10 may not be connected to the LAN 4 yet. In the following description, steps executed by the CPUs of the devices (e.g., the CPU 32 of the terminal device 10, etc.) will be described with the devices (e.g., the terminal device 10, etc.) as the subjects of action instead of describing the steps with the CPUs as the subjects of action, in view of easier understanding.

In T10, the printer 100 externally sends an Advertise signal according to the BLE scheme via the BT I/F 122. An Advertise signal is a so-called beacon signal and its destination is not specified. In other words, the printer 100 sends the Advertise signal to a plurality of unspecified devices. The Advertise signal from the printer 100 includes the key ID "k01" and the printer name "printer1" of the printer 100. The printer 100 is triggered to start sending the Advertise signal when turned on. The broken arrows in FIG. 2 indicate the BLE communication. The same applies to FIGS. 3 to 5 to be referred to later.

In the present case, the user unpacks the printer 200 and turns on the printer 200. Thus, the printer 200 starts externally sending an Advertise signal in T12. The Advertise signal from the printer 200 includes the key ID "k02" and the printer name "printer2" of the printer 200.

After the Advertise signals have been externally sent from the printers 100 and 200, the terminal device 10 receives the Advertise signals from the printers 100 and 200 via the BT I/F 22 in T10 and T12.

In T20, the terminal device 10 causes the display unit 12 to display a terminal confirmation screen to check if AP information currently stored in a printer (e.g., 100) should be transferred to another printer (e.g., 200). The terminal confirmation screen includes a message MS, an "OK" button, and a "Cancel" button. The message MS includes the printer name "printer1" included in the Advertise signal of T10 as the sender of the AP information and the printer name "printer2" included in the Advertise signal of T12 as the destination of the AP information. For example, in the case where both the terminal device 10 and the printer 100 are currently connected to the LAN 4, the terminal device 10 searches for printers within the LAN 4 and specifies the printer name "printer1", which matches the search result, as the sender of the AP information. Then, the terminal device 10 specifies the printer name "printer2", which does not match the search result, as the destination of the AP information. Displaying the terminal confirmation screen allows the user to confirm the sender printer and the destination printer.

In a variant, the terminal confirmation screen may include an input box in which the sender is designated from the printer name "printer1" in the Advertise signal of T10 and the printer name "printer2" in the Advertise signal of T12, and an input box in which the destination is designated from these two printer names That is, the sender and the destination may be designated by the user.

In T22, the user selects the "OK" button in the terminal confirmation screen. When receiving the selection of the "OK" button in T22, the terminal device 10 executes, via the BT I/F 22, predetermined communication (Scan Request, Scan Response, etc.) according to the BT scheme between the terminal device 10 and the printer 100 to establish a BT connection with the printer 100 in T24. The BT connection is a wireless connection according to the BLE scheme and is a wireless connection according to a so-called L2CAP (Logical Link Control and Application Protocol).

In T26, the terminal device 10 sends the printer 100 an AP information request using the BT connection via the BT I/F 22. The AP information request requests the AP information AI stored in the printer 100.

When receiving the AP information request from the terminal device 10 using the BT connection via the BT I/F 122 in T26, the printer 100 causes the display unit 112 to display a printer confirmation screen in T30. The printer confirmation screen includes a message that checks if it is permitted to transfer the AP information AI to another printer, an "OK" button, and a "Cancel" button.

In T32, the user operates the operation unit 114 to select the "OK" button in the printer confirmation screen. When receiving the selection of the "OK" button in T32, the printer 100 encrypts the AP information AI in T34 by using the private key PR1 which is included in the key information KI1. Encrypted AP information that is to be sent to the terminal device 10 is thereby generated. In a variant, the printer 100 may encrypt the AP information AI in advance before receiving the selection of the "OK" button.

In T36, the printer 100 sends the encrypted AP information to the terminal device 10, using the BT connection and via the BT I/F 122, as a response to the AP information request of T26. If the "Cancel" button in the printer confirmation screen is selected, the printer 100 skips steps of T34 and onward, and terminates the process of FIG. 2.

For example, a comparative example is assumed in which the printer confirmation screen is not displayed and the encrypted AP information is sent to the terminal device 10 without receiving an instruction from the user. In this comparative example, the encrypted AP information may be sent to the terminal device 10 even when the user of the terminal device 10 is not present around the printer 100. For example, the encrypted AP information may be sent to the terminal device 10 by a third party that is far away from the printer 100. Contrary to this, according to the configuration of the present embodiment, it is possible to send the encrypted AP information to the terminal device 10 in accordance with an instruction from the user around the printer 100, for example, the administrator of the printer 100. Thus, it is possible to prevent the encrypted AP information from being obtained by a third party. In a variant, the configuration of the comparative example above may be employed.

In T36, the terminal device 10 receives the encrypted AP information from the printer 100, using the BT connection and via the BT I/F 22, as the response to the AP information request of T26.

In T40, the terminal device 10 obtains, from the key table 44, the public key PU1 associated with the key ID "k01" received from the printer 100 in T10 and the public key PU2 associated with the key ID "k02" received from the printer 200 in T12.

For example, a comparative example is assumed in which an Advertise signal including the public key PU1 is received from the printer 100 and an Advertise signal including the public key PU2 is received from the printer 200. In this comparative example, the Advertise signals, which are beacon signals, may be received by a terminal device of a third party, and the public keys PU1, PU2 may be obtained by the third party. Contrary to this, according to the configuration of the present embodiment, the Advertise signals include the key IDs and the public keys are obtained from the key table 44 in the terminal device 10 by using the key IDs. That is, the third party could only obtain the key IDs, if any. It is possible to prevent the public keys from being obtained by a third party. In a variant, the configuration of the comparative example above may be employed.

In T42, the terminal device 10 decrypts the encrypted AP information received in T36 by using the public key PU1 obtained in T40 (i.e., the public key of the printer 100). The terminal device 10 thereby obtains the AP information AI.

In T44, the terminal device 10 encrypts the AP information AI obtained in T42 by using the public key PU2 obtained in T40 (i.e., the public key of the printer 200). Encrypted AP information that is to be sent to the printer 200 is thereby generated.

T50 in FIG. 3 that follows is the same as T24 in FIG. 2 except that the BT connection with the printer 100 is disconnected and a BT connection is established with the printer 200. The solid arrows in FIG. 3 indicate the Wi-Fi communication. The same applies to FIGS. 4 and 5 to be referred to later.

In T52, the terminal device 10 sends the printer 200, using the BT connection and via the BT I/F 22, the encrypted AP information generated in T44 of FIG. 2 and message information (not illustrated) indicative of a message to be displayed in a connection confirmation screen (which will be described later) (e.g., a plain text of the SSID "ap01" indicative of the AP 500). In a variant, the message information may not be sent.

In T52, the printer 200 receives the encrypted AP information from the terminal device 10, using the BT connection and via the BT I/F 222.

In T60, the printer 200 causes the display unit 212 to display a connection confirmation screen. The connection confirmation screen includes a message that checks if a connection should be established with an AP (e.g., 500), an "OK" button, and a "Cancel" button.

In T62, the user operates the operation unit 214 to select the "OK" button in the connection confirmation screen. When receiving the selection of the "OK" button in T62, the printer 200 decrypts, in T64, the encrypted AP information received in T52 by using the private key PR2 included in the key information KI2. The printer 200 thereby obtains the AP information AI. If the "Cancel" button is selected in the connection confirmation screen, the printer 200 skips steps of T64 and onward, and terminates the process of FIG. 3.

For example, as shown as T59 in FIG. 3, a comparative example is assumed in which the encrypted AP information is decrypted before the "OK" button is selected in the connection confirmation screen. In this comparative example, the decryption of the encrypted AP information is unnecessary if the "Cancel" button is selected in the connection confirmation screen. Contrary to this, according to the configuration of the present embodiment, the encrypted AP information is decrypted after the "OK" button has been selected in the connection confirmation screen, as indicated as T64. It is possible to prevent the encrypted AP information from being decrypted unnecessarily. Not decrypting the encrypted AP information before an instruction is given to the connection confirmation screen allows a reduction in the processing load on the printer 200 when the "Cancel" button is selected in the connection confirmation screen. In a variant, the configuration of the comparative example may be employed.

In T70, the printer 200 executes 4-way handshake communication with the AP 500. In at least a part of the 4-way handshake communication, the printer 200 and the AP 500 communicate encrypted informant that is encrypted by the password "xxxx" included in the AP information AI obtained in T64. Then, if the encrypted information is successfully decrypted, a wireless connection according to the Wi-Fi scheme is established between the printer 200 and the AP 500. The printer 200 is thus connected to the LAN 4 formed by the AP 500. In a variant, SAE (Simultaneous Authentication of Equals, commonly called "Dragonfly") communication may be used instead of 4-way handshake communication.

For example, a comparative example is assumed in which the connection confirmation screen is not displayed and the wireless connection with the AP 500 is established without receiving an instruction from the user. In this comparative example, the wireless connection with the AP 500 may be established even when the user of the printer 200 is not present around the printer 200. Thus, the wireless connection with the AP 500 may be established without the administrator of the printer 200 realizing the establishment. Contrary to this, according to the configuration of the present embodiment, the wireless connection with the AP 500 can be established in accordance with an instruction from the user around the printer 200, for example, the administrator of the printer 200. It is possible to prevent the wireless connection with the AP 500 from being established without the administrator of the printer 200 realizing the establishment. In a variant, the configuration of the comparative example above may be employed.

In T72, the printer 200 sends an IP address of the printer 200 in the LAN 4 to the terminal device 10, using the BT connection and via the BT I/F 222. For example, this IP address is assigned to the printer 200 by the AP 500.

When receiving the IP address of the printer 200 from the printer 200 in T72 using the BT connection and via the BT I/F 22, the terminal device 10 stores the IP address in the memory 34.

When receiving a print instruction at the operation unit 14 in T80, the terminal device 10 sends via the wireless LAN I/F 20, in T82, print data corresponding to an image to be printed, through LAN 4 and the AP 500, to the printer 200 which is specified by the IP address received in T72.

When receiving the print data in T82, via wireless LAN I/F 220, from the terminal device 10 through the LAN 4 and the AP 500, the printer 200 prints the image corresponding to the print data in T84.

(Effects of Present Embodiment)

For example, a comparative example is assumed in which both the printer 100 and the printer 200 store the same key information KI1 and the terminal device 10 encrypts and decrypts the AP information AI by using the key information KI1 to mediate the sending of the AP information AI from the printer 100 to the printer 200. In this comparative example, the printer 100 and the printer 200 need to share the key information KI1. Contrary to this, according to the configuration described above, the terminal device 10 decrypts the encrypted AP information by using the public key PU1 obtained using the key ID "k01" received from the printer 100 (T42 in FIG. 2) and encrypts the AP information AI by using the public key PU2 obtained using the key ID "k02" received from the printer 200 (T44 in FIG. 2). That is, the terminal device 10 can mediate the sending of the AP information AI from the printer 100 to the printer 200 (forward the AP information AI) not only when the public key PU1 and the public key PU2 are the same, but also when these keys are different from each other. There is no need to share key information between the printer 100 and the printer 200. This facilitates the encryption of the AP information AI for the intermediation of the AP information AI.

For example, a comparative example is assumed in which the printer 100 stores a first common key according to a common key encryption scheme and the printer 200 stores a second common key. In this comparative example, the terminal device 10 receives information indicative of the first common key (e.g., an ID) from the printer 100 and receives information indicative of the second common key (e.g., an ID) from the printer 200. Then, the terminal device 10 uses the first common key to decrypt the AP information encrypted by the printer 100 and uses the second common key to encrypt the AP information to be sent to the printer 200. For example, if a third party obtains the encrypted AP information and the second common key, the third party may decrypt the encrypted AP information by the second common key to obtain the AP information. Contrary to this, according to the configuration of the present embodiment, the public key encryption scheme is used. Since the non-public private key is not obtained by the third party even if the encrypted AP information and the public key is obtained by the third party, it is possible to prevent the encrypted AP information from being decrypted. In a variant, the configuration of the comparative example above may be employed.

Further, according to the configuration of the present embodiment, the Advertise signal from the printer 100 includes the printer name "printer1" of the printer 100 (T10 in FIG. 2) and the Advertise signal from the printer 200 includes the printer name "printer1" of the printer 200 (T12). Thus, the terminal device 10 can identify the printer 100 as the sender of the AP information AI and identify the printer 200 as the destination of the AP information AI. The terminal device 10 can suitably mediate the sending of the AP information AI from the printer 100 to the printer 200.

(Correspondence Relationships)

The communication system 2, the terminal device 10, the printer 100, and the printer 200 are examples of "communication system", "terminal device", "first communication device", and "second communication device", respectively. The display unit 12 of the terminal device 10 is an example of "display unit". The operation unit 114 and the printer name "printer1" of the printer 100 are examples of "first operation unit" and "first device identification information", respectively. The operation unit 214 and the printer name "printer2" of the printer 200 are examples of "second operation unit" and "second device identification information", respectively. The key information KI1, the public key PU1, the private key PR1, and the key ID "k01" of the printer 100 are examples of "first key information", "first key", "third key", and "first key identification information", respectively. The key ID "k01" is an example of "information indicating a first key". The key information KI2, the public key PU2, the private key PR2, and the key ID "k02" of the printer 200 are examples of "second key information", "second key", "fourth key", and "second key identification information", respectively. The key ID "k02" is an example of "information indicating a second key". The AP 500 and the AP information AI are examples of "specific device" and "connection information", respectively. The terminal confirmation screen of T20 in FIG. 2 is an example of "screen". The AP information request of T26 and the encrypted AP information of T36 in FIG. 2 are examples of "request" and "first encrypted connection information", respectively. The selection of the "OK" button in the printer confirmation screen of T32 in FIG. 2 is an example of "first predetermined operation". The selection of "OK" button in the connection confirmation screen of T62 in FIG. 3 is an example of "second predetermined operation". The encrypted AP information of T52 in FIG. 3 is an example of "second encrypted connection information"

In the "communication system", T10 in FIG. 2 is examples of "externally send information indicating a first key" and "receive the information indicating the first key from the first communication device". T12 is examples of "externally send information indicating a second key" and "receive the information indicating the second key from the second communication device". T36 is an example of "receive first encrypted connection information from the first communication device". T42 is an example of "decrypt the first encrypted connection information". T44 is an example of "generate second encrypted connection information". T52 in FIG. 3 is examples of "send the second encrypted connection information to the second communication device" and "receive the second encrypted connection information from the terminal device". T64 and T70 are examples of "decrypt the second encrypted connection information" and "establish the wireless connection", respectively.

In a "non-transitory computer-readable medium storing computer-readable instructions for a terminal device", T10, T12, T36, T42, and T44 in FIGS. 2 and T52 in FIG. 3 are examples of "receive the information indicating the first key from the first communication device", "receive the information indicating the second key", "receive first encrypted connection information from the first communication device", "decrypt the first encrypted connection information", "generate second encrypted connection information", and "send the second encrypted connection information to the second communication device", respectively.

In a "second communication device", the memory in the controller 230 is an example of "memory". T12 in FIGS. 2, T52, T64, and T70 in FIG. 3 are examples of "externally send information indicating a second key", "receive the second encrypted connection information from the terminal device", "decrypt the second encrypted connection information", and "establish the wireless connection", respectively.

In a "first communication device", the memory 134 is an example of "memory". T10 and T36 in FIG. 2 are examples of "externally send information indicating a first key" and "send first encrypted connection information to the terminal device".

Second Embodiment

In a second embodiment, wireless communication according to the Wi-Fi scheme is used as communication between the terminal device 10 and the printer 100 and communication between the terminal device 10 and the printer 200.

In the present embodiment, the wireless LAN I/Fs 20, 120, and 220 further support a WFD (Wi-Fi Direct (registered trademark)) scheme established by the Wi-Fi Alliance. The WFD scheme is a wireless communication scheme described in the specification "Wi-Fi Peer-to-Peer (P2P) Technical Specification Version1.1" created by the Wi-Fi Alliance.

Figure 4:
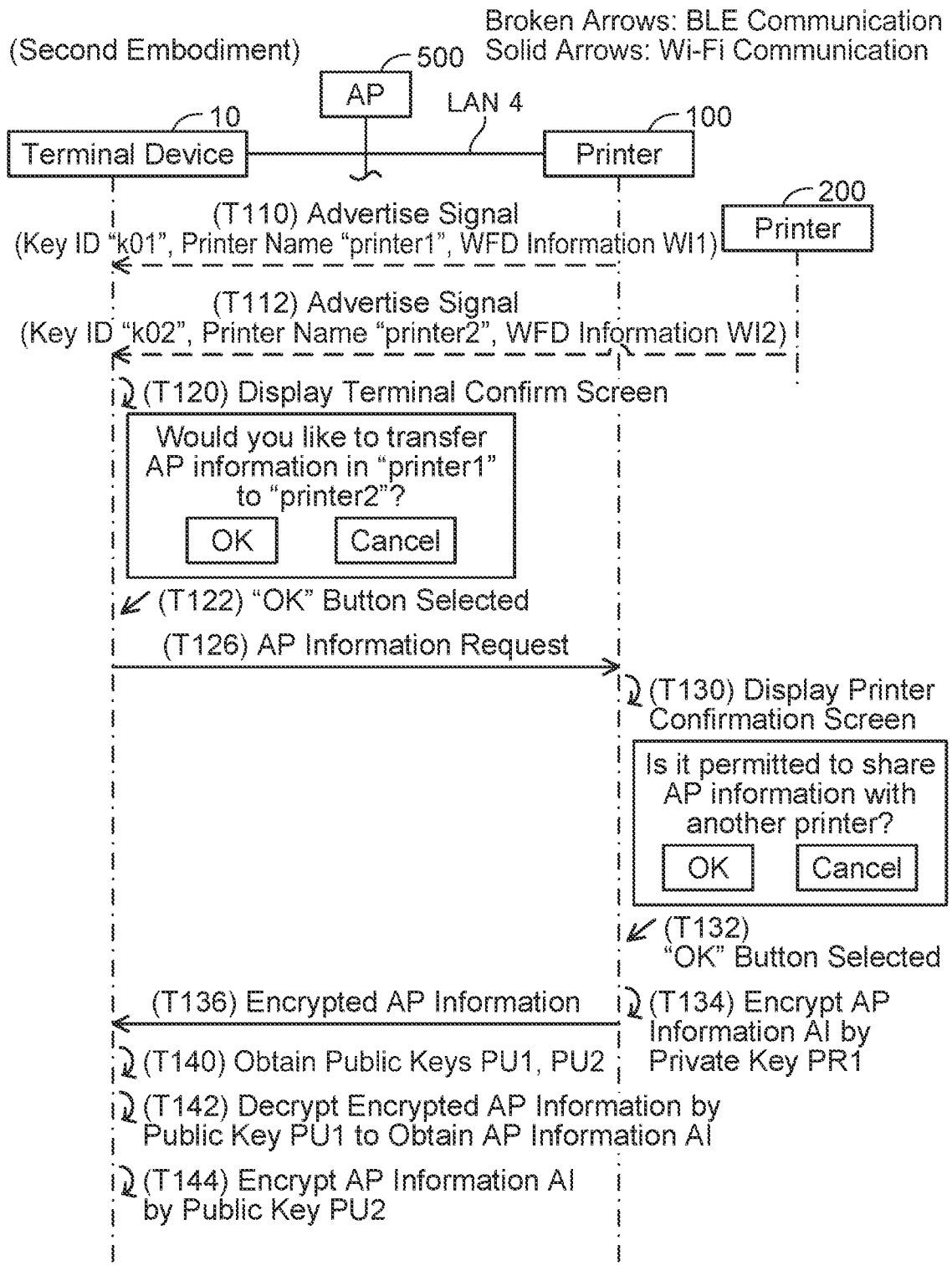
FIG. 4 illustrates a sequence diagram of a process executed by a communication system according to a second embodiment.

(Process Implemented by Communication System 2; FIGS. 4 and 5)

Referring to FIGS. 4 and 5, a process implemented by the communication system 2 according to the second embodiment will be described. In an initial stage of the present case, the terminal device 10 and the printer 100 are already connected to the LAN 4.

T110 is the same as T10 in FIG. 2 except that the Advertise signal includes WFD information WI1 of the printer 100. The WFD information WI1 includes information (e.g., an SSID) for connecting to a wireless network formed by the printer 100 operating as Group Owner (i.e., a parent station) of the WFD scheme. T112 is the same as T12 in FIG. 2 except that the Advertise signal includes WFD information WI2 of the printer 200.

T120 and T122 are the same as T20 and T22 in FIG. 2, respectively. As described, the terminal device 10 and the printer 100 are already connected to the LAN 4. In T126, the terminal device 10 sends, via the wireless LAN I/F 20, an AP connection request to the printer 100 through the LAN 4 and the AP 500. In the present case, a BT connection is not established between the terminal device 10 and the printer 100.

T130 to T134 are the same as T30 to T34 in FIG. 2. T136 is the same as T36 in FIG. 2 except that the encrypted AP information is sent to the terminal device 10 through the LAN 4 and the AP 500. T140 to T144 are the same as T40 to T44 in FIG. 2.

In T150 of FIG. 5, the terminal device 10 executes 4-way handshake communication with the printer 200 operating as Group Owner. In at least a part of the 4-way handshake communication, the WFD information WI2 received from the printer 200 in T112 of FIG. 4 is used. Then, a wireless connection according to the WFD scheme is established between the terminal device 10 and the printer 200. Thus, the terminal device 10 operates as a client (i.e., a child station) in a wireless network formed by the printer 200.

T152 is the same as T52 in FIG. 3 except that the wireless connection according to the WFD scheme is used. T160 to T170 are the same as T60 to T70 in FIG. 3. T172 is the same as T72 in FIG. 3 except that the wireless connection according to the WFD scheme is used. T180 to T184 are the same as T80 to T84 in FIG. 3.

As in the first embodiment, the present embodiment can facilitate the encryption of the AP information AI for the intermediation of the AP information AI. Further, as described, the communication speed of the Wi-Fi communication is faster than that of the BT communication. Thus, in the present embodiment, the communication speed of the communication between the terminal device 10 and each of the printers 100 and 200 is faster as compared to the first embodiment. On the other hand, the first embodiment has an advantage that the devices 10, 100, and 200 do not need to support the WFD scheme.

(Correspondence Relationships)

In a "communication system", T136 in FIG. 4 is an example of "receive first encrypted connection information from the first communication device". T152 in FIG. 5 is examples of "send the second encrypted connection information to the second communication device" and "receive the second encrypted connection information from the terminal device".

(Variant 1) At least one of the "first communication device" and the "second communication device" may be, for example, a terminal device such as a scanner, a FAX device, a multifunctional device, a PC, or the like.

(Variant 2) At least one of the "first key information" and the "second key information" may be, for example, information that includes a common key and an ID for identifying the common key. In another variant, the at least one of the first key information and the second key information may include the public key and the private key but may not include the key ID.

(Variant 3) At least one of the "information indicating a first key" and the "information indicating a second key" may not be limited to the key ID but may be the public key itself. In this variant, at least one of the "first key identification information" and the "second key identification information" may be omitted.

(Variant 4) The "specific device" is not limited to the AP 500 but may be, for example, a device operating as Group Owner of the WFD scheme (e.g., the terminal device 10) or a device operating as a parent station of a SoftAP scheme (e.g., the terminal device 10).

(Variant 5) In the embodiments above, the "OK" button is selected in the printer confirmation screen (T32 in FIG. 2). Instead of this, the printer confirmation screen may include an input box for authentication information (e.g., a user password). In the case where information inputted to the input box is successfully authenticated, the printer 100 may send the encrypted AP information to the terminal device 10. In this variant, the input of the information to the input box is an example of the "first predetermined operation". In another variant, the user may hold a card key over the printer 100. In the case where information in the card key is successfully authenticated, the printer 100 may send the encrypted AP information to the terminal device 10. In this variant, holding the card key over the printer 100 is an example of the "first predetermined operation".

(Variant 6) T30 and T32 in FIG. 2 may not be executed. In this variant, the "first operation unit" and the "first predetermined operation" may be omitted.

(Variant 7) In the embodiments above, the "OK" button is selected in the connection confirmation screen (T62 in FIG. 3). Instead of this, the connection confirmation screen may include an input box for authentication information. In the case where information inputted to the input box is successfully authenticated, the printer 200 may establish a wireless connection with the AP 500. In this variant, the input of the information to the input box is an example of the "second predetermined operation". In another variant, the user may hold a card key over the printer 200. In the case where information in the card key is successfully authenticated, the printer 200 may establish a wireless connection with the AP 500. In this variant, holding the card key over the printer 200 is an example of the "second predetermined operation".

(Variant 8) T60 and T62 in FIG. 3 may not be executed. In this variant, the "second operation unit" and the "second predetermined operation" may be omitted.

(Variant 9) At least one of the "information indicating a first key" and the "information indicating a second key" may be sent to a plurality of unspecified devices by broadcasting or by multicast.

(Variant 10) The devices 10, 100, and 200 may not support version 4.0 of the Bluetooth scheme (i.e., the BLE scheme). The devices 10, 100, and 200 may support a version earlier than version 4.0 of the Bluetooth scheme.

(Variant 11) The Advertise signal(s) may not include the printer name(s). In this variant, at least one of the "first device identification information" and the "second device identification information" may be omitted.

(Variant 12) T20 in FIG. 2 may not be executed. In this variant, the "screen" may be omitted.

(Variant 13) In the embodiments above, the processes of FIGS. 2 to 5 are implemented by software (e.g., the programs 40, 42, 140, etc.), however, at least one of the processes may be implemented by hardware such as a logic circuit, etc.

What is claimed is:

1. A communication system comprising:
a terminal device comprising a terminal memory;
a first communication device comprising a first memory configured to store first key information for encrypting and decrypting information; and
a second communication device comprising a second memory configured to store second key information for encrypting and decrypting information, wherein the first communication device is configured to externally send information indicating a first key included in the first key information, the second communication device is configured to externally send information indicating a second key included in the second key information;
the terminal device is configured to:
receive the information indicating the first key from the first communication device;
receive the information indicating the second key from the second communication device;
in response to sending a request to the first communication device, receive first encrypted connection information from the first communication device as a response to the request, the first encrypted connection information being information that is obtained and encrypted by the first communication device by using the first key information, and
the connection information being for establishing a wireless connection with a specific device;
in a case where the first encrypted connection information is received from the first communication device, decrypt the first encrypted connection information by using the first key indicated by the information received from the first communication device so as to obtain the connection information;
generate second encrypted connection information by encrypting the obtained connection information by using the second key indicated by the information received from the second communication device; and
send the second encrypted connection information to the second communication device;
the second communication device is further configured to:
receive the second encrypted connection information from the terminal device;
in a case where the second encrypted connection information is received from the terminal device, decrypt the second encrypted connection information by using the second key information so as to obtain the connection information; and
in a case where a user input is received on the second communication device, in response to selection of a button, for agreeing to establishing the wireless connection with the specific device, establish the wireless connection with the specific device by using the obtained connection information, wherein in a case where the button is not selected, the wireless connection with the specific device is not established;
wherein the first communication device is further configured to, in a case where another user input is received by selecting a specific button of the first communication device after the request has been received from the terminal device, send the first encrypted connection information to the terminal device as the response, wherein in a case where the specific button is not selected after the request has been received from the terminal device, the response is not sent to the terminal device.

2. The communication system as in claim 1, wherein the first key information includes the first key that is a first public key and a third key that is a first private key,
the second key information includes the second key that is a second public key and a fourth key that is a second private key,
the first communication device encrypts the connection information by using the third key of the first key information, and the second communication device decrypts the second encrypted connection information by using the fourth key of the second key information.

3. The communication system as in claim 1, wherein the information indicating the first key includes first key identification information for identifying the first key, the information indicating the second key includes second key identification information for identifying the second key, the terminal device is further configured to:
obtain the first key by using the first key identification information included in the information received from the first communication device; and
obtain the second key by using the second key identification information included in the information received from the second communication device.

4. The communication system as in claim 1, wherein in the case where the user input is received by selecting the button, the second communication device decrypts the second encrypted connection information, wherein in the case where the button is not selected, the second encrypted connection information is not decrypted.

5. The communication system as in claim 1, wherein the second communication device decrypts the second encrypted connection information before the user input is received.

6. The communication system as in claim 1, wherein the first communication device sends the information indicating the first key to a plurality of unspecified devices, and the second communication device sends the information indicating the second key to a plurality of unspecified devices.

7. The communication system as in claim 6, wherein the first communication device sends the information indicating the first key to the plurality of unspecified devices by using an Advertise signal according to version 4.0 or later of a Bluetooth scheme, and the second communication device sends the information indicating the second key to the plurality of unspecified devices by using the Advertise signal.

8. The communication system as in claim 1, wherein the first communication device further externally sends first device identification information for identifying the first communication device, the second communication device further externally sends second device identification information for identifying the second communication device, the terminal device further receives the first device identification information from the first communication device, the terminal device further receives the second device identification information from the second communication device, the terminal device receives the first encrypted connection information from the first communication device identified by the received first device identification information, and the terminal device sends the second encrypted connection information to the second communication device identified by the received second device identification information.

9. The communication system as in claim 1, wherein the terminal device comprises a display unit, and the terminal device is further configured to cause the display unit to display a screen that includes an image corresponding to the first device identification information as a sender of the connection information and an image corresponding to the second device identification information as a receiver of the connection information.

10. The communication system as in claim 1, wherein the terminal device receives the first encrypted connection information from the first communication device according to a Bluetooth scheme, the terminal device sends the second encrypted connection information to the second communication device according to the Bluetooth scheme, and the second communication device receives the second encrypted connection information from the terminal device according to the Bluetooth scheme.

11. The communication system as in claim 1, wherein the terminal device receives the first encrypted connection information from the first communication device according to a Wi-Fi scheme, the terminal device sends the second encrypted connection information to the second communication device according to the Wi-Fi scheme, and the second communication device receives the second encrypted connection information from the terminal device according to the Wi-Fi scheme.

12. A second communication device comprising:
a processor; and a second memory storing computer-readable instructions and second key information for encrypting and decrypting information, wherein the second key information is different from first key information stored in a first memory of a first communication device different from the second communication device;
wherein the computer-readable instructions, when executed by the processor, cause the second communication device to:
externally send information indicating a second key that is among the second key information, wherein the information indicating the second key is received by a terminal device, wherein the terminal device, comprising a terminal memory, receives information indicating a first key from the first communication device;
in response to sending a request to the first communication device, the terminal device receives first encrypted connection information from the first communication device as a response to the request;
the terminal device decrypts the first encrypted connection information by using the first key indicated by the information received from the first communication device so as to obtain connection information for establishing a wireless connection with a specific device;
the terminal device generates second encrypted connection information by encrypting the obtained connection information by using the second key indicated by the information received from the second communication device; and
the terminal device sends the second encrypted connection information to the second communication device;
receive the second encrypted connection information from the terminal device;
in a case where the second encrypted connection information is received form the terminal device, decrypt the second encrypted connection information by using the second key information so as to obtain the connection information; and in a case where a user input is received on the second communication device, in response to selection of a button, for agreeing to establishing the wireless connection with the specific device, establish the wireless connection with the specific device by using the obtained connection information, wherein in a case where the button is not selected, the wireless connection with the specific device is not established;

wherein the first communication device is further configured to, in a case where another user input is received by selecting a specific button of the first communication device after the request has been received from the terminal device, send the first encrypted connection information to the terminal device as the response, wherein in a case where the specific button is not selected after the request has been received from the terminal device, the response is not sent to the terminal device.

* * * * *

UNITED STATES PATENT AND TRADEMARK OFFICE
CERTIFICATE OF CORRECTION

PATENT NO. : 12,261,943 B2
APPLICATION NO. : 17/533515
DATED : March 25, 2025
INVENTOR(S) : Takeshi Shiotani Page 1 of 1

It is certified that error appears in the above-identified patent and that said Letters Patent is hereby corrected as shown below:

In the Claims

Column 16, Claim 9, Line 1 should read:
9. The communication system as in claim 8, wherein the Signed and Sealed this
Twenty-ninth Day of April, 2025

Coke Morgan Stewart
*Acting Director of the United States Patent and Trademark Office*